US011177986B1

(12) United States Patent
Ganesan et al.

(10) Patent No.: US 11,177,986 B1
(45) Date of Patent: Nov. 16, 2021

(54) LANE ADAPTATION IN HIGH-SPEED SERIAL LINKS

(71) Applicant: Texas Instruments Incorporated, Dallas, TX (US)

(72) Inventors: Aravind Ganesan, Bangalore (IN); Harshavardhan Adepu, Bengarulu (IN); Rakesh Chikkanayakanahalli Manjunath, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/205,456

(22) Filed: Mar. 18, 2021

(30) Foreign Application Priority Data

Nov. 24, 2020 (IN) .............................. 202041051018

(51) Int. Cl.
*H04L 27/01* (2006.01)
*H04L 25/03* (2006.01)
*H04L 27/34* (2006.01)

(52) U.S. Cl.
CPC ........ *H04L 27/01* (2013.01); *H04L 25/03019* (2013.01); *H04L 25/03878* (2013.01); *H04L 27/3411* (2013.01)

(58) Field of Classification Search
CPC ..... H04L 7/0016; H04L 7/002; H04L 7/0025; H04L 7/0029; H04L 27/01; H04L 27/3411; H04L 25/03019; H04L 25/03878
See application file for complete search history.

(56) References Cited

U.S. PATENT DOCUMENTS

| 4,615,038 | A | * | 9/1986 | Lim ........................ H04L 27/01 333/18 |
| 5,757,857 | A | * | 5/1998 | Buchwald ............. H04L 7/0274 329/306 |
| 5,764,695 | A | * | 6/1998 | Nagaraj ............ H04L 25/03885 375/232 |
| 5,966,415 | A | * | 10/1999 | Bliss ................ G11B 20/10009 375/341 |
| 6,014,768 | A | * | 1/2000 | Lee ........................ H04L 1/0054 714/746 |

(Continued)

OTHER PUBLICATIONS

Smalley, "Equalization Concepts: A Tutorial", SPRA140 (Texas Instruments Incorporated, 1994).

(Continued)

*Primary Examiner* — James M Perez
(74) *Attorney, Agent, or Firm* — John R. Pessetto; Charles A. Brill; Frank D. Cimino

(57) ABSTRACT

Adaptive equalizer circuitry including both a continuous time equalizer (CTE) and a discrete time equalizer (DTE) and a method of jointly adapting the CTE and DTE in lane adaptation. Jointly adaptation of the CTE and DTE is performed by adapting the DTE at each of a plurality of filter characteristic settings of the CTE and determining a figure of merit for signals filtered by the CTE and DTE at that condition. Adaptation of the DTE may be performed by dynamically adjusting a convergence coefficient based on a history of error gradients. After a figure of merit is determined for each of the plurality of CTE filter characteristics, a CTE filter characteristic setting is then selected based on those figure of merit values, for example at a CTE setting near a midpoint of an acceptable region of figure of merit values.

22 Claims, 6 Drawing Sheets

(56) References Cited

U.S. PATENT DOCUMENTS

| | | | | |
|---|---|---|---|---|
| 6,240,133 B1* | 5/2001 | Sommer | H04N 5/211 | 375/232 |
| 6,366,613 B2* | 4/2002 | Sommer | H04N 5/211 | 375/232 |
| 6,389,062 B1* | 5/2002 | Wu | H04L 25/03159 | 375/222 |
| 6,418,164 B1* | 7/2002 | Endres | H04L 27/01 | 348/607 |
| 6,480,559 B1* | 11/2002 | Dabak | H04L 7/042 | 370/514 |
| 6,509,773 B2* | 1/2003 | Buchwald | H03L 7/0816 | 327/248 |
| 6,647,071 B2* | 11/2003 | Sommer | H04N 5/211 | 375/285 |
| 6,671,244 B2* | 12/2003 | Honma | G11B 20/10009 | 369/124.07 |
| 6,968,480 B1* | 11/2005 | Yuan | H04L 25/4923 | 714/700 |
| 6,995,594 B2* | 2/2006 | Buchwald | H03L 7/0814 | 327/248 |
| 7,058,150 B2* | 6/2006 | Buchwald | H04L 7/0337 | 375/355 |
| 7,245,638 B2* | 7/2007 | Agazzi | H03M 1/0624 | 370/516 |
| 7,421,018 B2* | 9/2008 | Anim-Appiah | H04L 25/03343 | 375/232 |
| 7,486,894 B2* | 2/2009 | Aronson | H04B 10/40 | 398/128 |
| 7,564,866 B2* | 7/2009 | Agazzi | H03M 1/0624 | 370/463 |
| 7,643,599 B2* | 1/2010 | Willis | H03D 13/003 | 375/371 |
| 7,656,939 B2* | 2/2010 | Gondi | H04L 25/03885 | 375/229 |
| 7,697,600 B2* | 4/2010 | Maangat | H04L 25/03885 | 375/229 |
| 7,738,567 B2* | 6/2010 | Miller | H04L 25/0266 | 375/258 |
| 7,742,520 B2* | 6/2010 | Simpson | H04L 7/033 | 375/229 |
| 7,764,757 B2* | 7/2010 | Hidaka | H04L 25/061 | 375/354 |
| 7,769,090 B2* | 8/2010 | Peleg | H04B 3/48 | 375/257 |
| 7,778,286 B2* | 8/2010 | Agazzi | H04B 10/6933 | 370/516 |
| 7,831,005 B2* | 11/2010 | Kuwata | H04L 7/0091 | 375/371 |
| 7,885,367 B2* | 2/2011 | Nishimura | H04L 7/048 | 375/373 |
| 7,916,780 B2* | 3/2011 | Lee | H04L 25/03885 | 375/232 |
| 7,974,375 B2* | 7/2011 | Kim | H03L 7/0891 | 375/376 |
| 8,050,373 B2* | 11/2011 | Buchwald | H04L 25/20 | 375/356 |
| 8,325,793 B2* | 12/2012 | Zhong | H04L 25/03019 | 375/233 |
| 8,351,560 B2* | 1/2013 | Buchwald | H04L 25/20 | 375/356 |
| 8,396,110 B1* | 3/2013 | Hsieh | H04L 25/03057 | 375/233 |
| 8,428,113 B1* | 4/2013 | Katie | H04L 25/03318 | 375/232 |
| 8,526,551 B2* | 9/2013 | Flynn | H04L 25/03878 | 375/346 |
| 8,649,476 B2* | 2/2014 | Malipatil | H04L 7/0062 | 375/355 |
| 8,791,735 B1* | 7/2014 | Shibasaki | H04L 25/03057 | 327/156 |
| 8,817,867 B1* | 8/2014 | Annampedu | H04L 25/03057 | 375/233 |
| 8,848,774 B2* | 9/2014 | Zhong | H04L 25/03343 | 375/232 |
| 8,855,186 B2* | 10/2014 | Tan | H04L 25/03057 | 375/233 |
| 8,917,803 B1* | 12/2014 | Asuncion | H04L 7/033 | 375/354 |
| 8,958,504 B2* | 2/2015 | Warke | H04L 27/0014 | 375/327 |
| 8,989,329 B2* | 3/2015 | Hammad | H04L 7/0079 | 375/355 |
| 8,995,514 B1* | 3/2015 | Asuncion | H04B 3/462 | 375/226 |
| 9,049,075 B2* | 6/2015 | Juenemann | H04L 27/02 | |
| 9,083,366 B1* | 7/2015 | Annampedu | H04L 7/0331 | |
| 9,124,454 B1* | 9/2015 | Venkataraman | H04L 25/03343 | |
| 9,130,683 B2* | 9/2015 | Murali | H04H 40/45 | |
| 9,191,194 B2* | 11/2015 | Robertson | H03L 7/0807 | |
| 9,191,245 B2* | 11/2015 | Tan | H04L 25/03057 | |
| 9,237,044 B1* | 1/2016 | Wu | H04L 25/03343 | |
| 9,270,291 B1* | 2/2016 | Parnaby | H03M 1/1028 | |
| 9,313,017 B1* | 4/2016 | Liao | H04L 7/0062 | |
| 9,313,056 B1* | 4/2016 | Berke | H04L 25/03343 | |
| 9,397,824 B1* | 7/2016 | Hoshyar | H04L 7/0331 | |
| 9,397,868 B1* | 7/2016 | Hossain | H04L 7/033 | |
| 9,397,872 B2* | 7/2016 | Kamali | H04B 3/46 | |
| 9,413,524 B1* | 8/2016 | Xu | H04L 7/0087 | |
| 9,438,409 B1* | 9/2016 | Liao | H04L 7/0087 | |
| 9,455,848 B1* | 9/2016 | Zhang | H04L 7/0062 | |
| 9,479,366 B2* | 10/2016 | Zheng | H04L 27/01 | |
| 9,614,659 B2* | 4/2017 | Hoshyar | H04L 7/0016 | |
| 9,742,594 B2* | 8/2017 | Dallaire | H04L 25/03006 | |
| 9,762,381 B2* | 9/2017 | Zhong | H04L 7/0058 | |
| 9,800,438 B1* | 10/2017 | Zhang | H04L 7/0087 | |
| 9,960,902 B1* | 5/2018 | Lin | H04L 7/0037 | |
| 10,009,199 B2* | 6/2018 | Suzuki | H04L 7/0016 | |
| 10,014,907 B2* | 7/2018 | Choi | H04B 3/46 | |
| 10,038,545 B1* | 7/2018 | Wu | H03L 7/0807 | |
| 10,038,575 B1* | 7/2018 | Steffan | H04L 27/01 | |
| 10,050,814 B1* | 8/2018 | Hoshyar | H04L 25/03267 | |
| 10,110,319 B1* | 10/2018 | Hueda | H04B 10/616 | |
| 10,236,892 B2* | 3/2019 | Moballegh | H03L 7/0807 | |
| 10,277,431 B2* | 4/2019 | Tajalli | H03K 19/21 | |
| 10,305,704 B1* | 5/2019 | Kenyon | H04L 25/03057 | |
| 10,454,485 B1* | 10/2019 | Malhotra | H03L 7/0807 | |
| 10,469,291 B2* | 11/2019 | Berke | H04L 25/03057 | |
| 10,491,365 B1* | 11/2019 | Lin | H03L 7/0807 | |
| 10,547,475 B1* | 1/2020 | Gagnon | H04L 25/03057 | |
| 10,560,291 B2* | 2/2020 | Lee | H04L 25/03159 | |
| 10,721,106 B1* | 7/2020 | Hormati | H04L 25/03019 | |
| 10,742,458 B2* | 8/2020 | Fujii | H04L 25/03885 | |
| 10,749,720 B1* | 8/2020 | Balan | H04L 27/01 | |
| 10,791,009 B1* | 9/2020 | Wu | H04L 25/03885 | |
| 10,840,919 B1* | 11/2020 | Subramanian | H03L 7/0807 | |
| 10,892,911 B2* | 1/2021 | Wojciechowski | H04L 12/40039 | |
| 10,938,607 B2* | 3/2021 | Shen | H04L 25/03267 | |
| 10,992,501 B1* | 4/2021 | Sun | H03L 7/081 | |
| 2002/0039394 A1* | 4/2002 | Buchwald | H03L 7/0814 | 375/355 |
| 2002/0080898 A1* | 6/2002 | Agazzi | H04B 10/6971 | 375/355 |
| 2004/0190649 A1* | 9/2004 | Endres | H03G 3/3089 | 375/326 |
| 2005/0089089 A1* | 4/2005 | Anim-Appiah | H04L 25/03343 | 375/232 |
| 2007/0280383 A1* | 12/2007 | Hidaka | H04L 25/063 | 375/346 |
| 2008/0159415 A1* | 7/2008 | Miller | H04L 25/063 | 375/258 |
| 2010/0177816 A1* | 7/2010 | Malipatil | H04L 25/03057 | 375/233 |
| 2010/0329318 A1* | 12/2010 | Dai | H04L 1/20 | 375/224 |

(56) References Cited

U.S. PATENT DOCUMENTS

| | | | | |
|---|---|---|---|---|
| 2010/0329325 A1* | 12/2010 | Mobin | .............. | H04L 25/03057 375/232 |
| 2012/0072784 A1* | 3/2012 | Li | .................. | G06F 11/267 714/704 |
| 2012/0128055 A1* | 5/2012 | Jiang | ................ | H04L 25/03057 375/233 |
| 2012/0230495 A1* | 9/2012 | Murali | ................... | H04H 40/45 381/3 |
| 2012/0235720 A1* | 9/2012 | Jiang | ................... | H04L 7/0332 327/158 |
| 2013/0195231 A1* | 8/2013 | Hearne | ............... | H03G 3/3078 375/345 |
| 2013/0241622 A1* | 9/2013 | Zerbe | ................... | H03K 3/013 327/323 |
| 2013/0243070 A1* | 9/2013 | Ito | .......................... | H04L 27/01 375/233 |
| 2014/0064351 A1* | 3/2014 | Hidaka | ............ | H04L 25/03057 375/232 |
| 2014/0169426 A1* | 6/2014 | Aziz | ...................... | H03F 3/195 375/224 |
| 2014/0169439 A1* | 6/2014 | Liu | ................... | H04L 25/03038 375/233 |
| 2014/0254655 A1* | 9/2014 | Zhong | .............. | H04L 25/03019 375/233 |
| 2014/0269881 A1* | 9/2014 | He | ................... | H04L 25/03878 375/231 |
| 2014/0307769 A1* | 10/2014 | He | ................... | H04L 25/03949 375/233 |
| 2015/0117511 A1* | 4/2015 | Lyubomirsky | ..... | H04B 10/0795 375/233 |
| 2015/0180642 A1* | 6/2015 | Hsieh | ............... | H04L 25/03057 375/233 |
| 2016/0006589 A1* | 1/2016 | Kamali | ............ | H04L 25/03343 375/232 |
| 2016/0116936 A1* | 4/2016 | Jeong | .................. | G06F 13/4068 713/503 |
| 2016/0218899 A1* | 7/2016 | Hoshyar | ........... | H04L 25/03261 |
| 2017/0005785 A1* | 1/2017 | Aleksic | ............ | H04L 25/03057 |
| 2017/0132966 A1* | 5/2017 | Lim | ........................ | G09G 5/18 |
| 2018/0302264 A1* | 10/2018 | Liao | ........................ | H04L 27/06 |
| 2019/0052488 A1* | 2/2019 | Fujii | ................ | H04L 25/03076 |
| 2020/0365199 A1* | 11/2020 | Seong | ....................... | H03L 7/07 |
| 2021/0006439 A1* | 1/2021 | Li | ...................... | H04B 10/6971 |
| 2021/0119835 A1* | 4/2021 | Levin | ..................... | G06F 13/4282 |

OTHER PUBLICATIONS

Natal, "Transmitter Optimization for > 25 Gbps Retimer Links", Application Report SNLA252 (Texas Instruments Incorporated, 2017).

Texas Instruments Incorporated, "Extend Reach—Distribute Signals" (2017).

Malik et al., "Adaptive Equalization Algorithms: An Overview", Int'l J. Adv. Computer Sci. and Applications, vol. 2, No. 3 (IJACSA, 2011), pp. 62-67.

Stephens, "Optimize equalization for FFE, CTLE, DFE, and crosstalk," EDN, available at https://www.edn.com/optimize-equalization-for-ffe-ctle-dfe-and-crosstalk (2015) pp. 1-5.

Johns, "Equalization", available at https://www.eecg.utoronto.ca/~johns/nobots/courses/ece1392/equalization2.pdf (University of Toronto, 1997).

DS280DF810 Data Sheet (Texas Instruments Incorporated, 2019).

Sackinger, "Adaptive Equalizers", Analysis and Design of Transimpedance Amplifiers for Optical Receivers (John Wiley & Sons, 2018), pp. 451-467.

\* cited by examiner

LANE ADAPTATION IN HIGH-SPEED SERIAL LINKS

CROSS-REFERENCE TO RELATED APPLICATIONS

This application claims, under 35 U.S.C. § 119, the benefit of and priority to Indian Provisional Application No. 202041051018 filed Nov. 24, 2020, which is hereby fully incorporated herein by reference.

BACKGROUND OF THE INVENTION

This relates to the field of data communication, and is more specifically directed to signal conditioning in high-speed serial data communication.

High data rate network and telecommunication systems are now commonplace, with the desired and actual data rates having increased, for modern "5G" telecommunication and Ethernet networks, well into the tens and hundreds of GHz, respectively. These high data rates are now commonly supported in and between network nodes and within the network infrastructure itself by high-speed serial communication links operating at frequencies well into the radio frequency (RF) domain. Such high-speed RF serial communication necessitates the use of signal conditioning to compensate for non-ideal effects such as frequency-dependent attenuation, inter-symbol interference, jitter, and channel distortion, especially to reach the necessary signal-to-noise ratios for more complex modulation schemes. Without such signal conditioning, high-speed serial links over coaxial or other cabling, or even printed circuit board traces, can behave as lossy channels at these high frequencies.

To address these issues, one or more retimers are commonly implemented along the high-speed serial link, such as in and between network endpoints in high-speed Ethernet and wireless telecommunications networks and infrastructure. Retimers are also used in other applications such as artificial intelligence (AI) processors, network processors, and the like. Conventional retimers, such as the DS250DF810 retimer available from Texas Instruments Incorporated, include adaptive continuous time and discrete time equalizers that process the received signal to correct signal integrity issues and then transmit the conditioned signal along the communications link. Typically, adaptation of these equalizers in the receiver path is performed in an "auto-tuned" manner to accommodate channel conditions.

At the establishment of a communications link, the retimer performs clock recovery from the received signal and adapts its equalizers according to the characteristics of the transmitter and of the dispersive transmission channel between the source transmitter and the retimer. This adaptation of the equalizers is commonly referred to as "lane adaptation." Conventional retimers that include both continuous time and discrete time equalizers iteratively perform lane adaptation by independently adapting each equalizer. Such conventional approaches are proving to be too slow (e.g., requiring on the order of a few hundred milliseconds for lane adaptation) to meet the needs of newer communications technologies. For example, 5G communications standards necessitate link establishment to be performed within 500 msec. Considering that more than one retimer may be deployed along the link signal path, the budget allocated for each retimer to perform the operations of clock recovery ("PLL lock") and lane adaptation may be as short as 50 msec. The challenge presented by this short link establishment time is exacerbated by the use of PAM4 modulation to achieve the desired data rate of 56 Gbps in 5G serializer/deserializer (SERDES) lanes. While this more complex modulation doubles the data rate relative to non-return-to-zero (NRZ) modulation, this increase in data rate comes at the cost of poorer signal-to-interference and signal-to-noise ratios that increase the burden on equalizer performance to achieve suitable signal integrity.

One conventional approach to discrete time equalizer adaptation is commonly known in the art follows a "least mean squares" (LMS) error minimization algorithm to derive the tap weights for the digital filters used to implement either or both of a feed-forward equalizer (FFE) and a decision feedback equalizer (DFE). LMS optimization of the vector h of tap weights is an iterative process that adjusts the vector h in a given iteration n by:

$$h^n = \mu(\Psi^n) + h^{n-1}$$

where $\Psi^n$ is a gradient of error (e.g., mean squared error) at the $n^{th}$ iteration, and $\mu$ is a convergence coefficient, commonly referred to as representing the "bandwidth of adaptation." According to a conventional "gear shift" approach applied to lane adaptation for serial communications, the convergence coefficient $\mu$ has an initial value $\mu^{init}$ for the first $n^{init}$ adaptation iterations in initialization, and a lower value $\mu^{steady\_state}$ following those initial $n^{init}$ iterations. This operation enables faster progress toward convergence initially, effecting large changes in tap weights while the error is expected to be quite large, followed by smaller tap weight adjustments and thus greater stability as the adaptation converges.

Channel conditions in the communication link are determined both by static channel characteristics, such as trace length and circuit board material, but also by characteristics that vary over time and environmental conditions. These channel variations include relatively slow changes over time, such as temperature changes and low frequency jitter, but can also include more dynamic changes, such as time-varying interference levels, data multiplexer changes, and the like. In either case, the effects of time-varying channel conditions result in the initial adaptation of adaptive equalizers in a retimer or other network node at the time of link establishment to no longer be optimal as time passes.

BRIEF SUMMARY OF THE INVENTION

According to one aspect, adaptive equalizer circuitry includes both a continuous time equalizer (CTE) and a discrete time equalizer (DTE), in combination with a slicer that quantizes the output of the DTE. Digital logic circuitry is provided for jointly adapting the CTE and DTE by adapting the DTE at each of a plurality of filter characteristic settings of the CTE and determining a figure of merit for signals filtered by the CTE and DTE at that condition. A CTE filter characteristic setting is then selected based on those figure of merit values, and the CTE at that setting in combination with the adapted DTE for that setting are then used to filter input signals received by the receive path circuitry.

According to another aspect, a method of performing lane adaptation in a serial communications channel including an adaptive equalizer comprising a continuous time equalizer (CTE) and a discrete time equalizer (DTE) is provided. Joint adaptation of the CTE and DTE is performed by adapting the DTE at each of a plurality of filter characteristic settings of the CTE and determining a figure of merit for signals filtered by the CTE and DTE at that condition. A CTE filter characteristic setting is then selected based on those figure of merit values, and the CTE at that setting in combination with the adapted DTE for that setting is used to filter received input signals received by the receive path circuitry.

According to another aspect, a method of adapting a discrete time equalizer (DTE) is provided. An input signal is filtered by the DTE, and the filtered signal quantized to a digital symbol value. An error gradient is determined from the digital symbol value in a current iteration, and a convergence coefficient is determined from the error gradient in the current iteration and an error gradient from a previous iteration. Tap weights of a discrete time filter in the DTE are updated, and the process repeated until a convergence criterion is met.

One or more of these aspects enable a serial communication receive path architecture with reduced lane adaptation time during link establishment.

One or more of these aspects enable such a serial communication receive path architecture with the capability of rapid post-initialization re-adaptation.

One or more of these aspects enable such an architecture suitable for implementation in high data rate communications applications, including those with complex modulation schemes.

Technical advantages enabled by the disclosed aspects will be apparent to those of ordinary skill in the art having reference to the following specification together with its drawings.

DETAILED DESCRIPTION OF THE INVENTION

The one or more embodiments described in this specification are in the context of adaptive equalizer circuitry and methods of lane adaptation in retimers used in high-speed serial communication technologies, for example in high speed (200G/400G) Ethernet and 5G wireless communications, as it is contemplated that implementation of these embodiments is particularly advantageous in such contexts. However, it is also contemplated that aspects of these embodiments may be beneficially applied in other applications for adaptive equalizers, for example in the receive path of a network node or infrastructure node in other communications applications and using any one of a number of signal modulation schemes, in data transfer paths within individual apparatuses, in other hardware systems such as artificial intelligence (AI) processors, network processors, and the like. Accordingly, it is to be understood that the following description is provided by way of example only and is not intended to limit the true scope of this invention as claimed.

Figure 1:
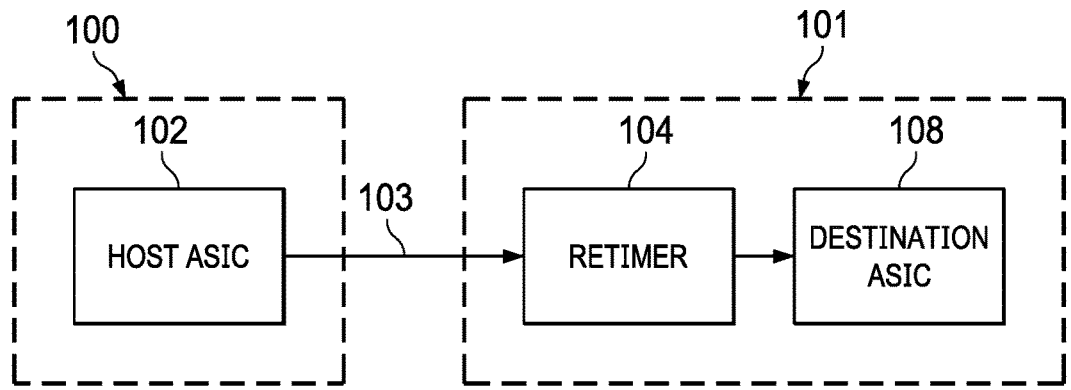
FIG. 1 is an electrical diagram, in block form, of a communications link architecture in which embodiments may be implemented.

FIG. 1 illustrates an example of a communications link into which the described embodiments may be implemented. In this example, source end-point 100 is the source of serial data communications to destination end-point 101 over a high-speed serial communications link, such as a SERDES link, established between end-points 100, 101 over wired communication channel 103. For the example of a modern 5G wireless cellular system, source end-point 100 may correspond to a wireless base station or access point, and destination end-point 101 may correspond to a switch fabric or other core network function, such as implemented in a line card at a backhaul element or other such network node. In this example, source end-point 100 includes additional functional circuitry such as host application-specific integrated circuit (ASIC) 102 for processing the received data (e.g., from a mobile station communicating to source end-point 100 over a radio link) and controlling the operation of source end-point 100, and destination end-point 101 similarly includes destination ASIC 108 for processing data received over link 103. Each of end-points 100, 101 may be realized by one or more than one physical system or network node of different types and function supporting the communications link.

In typical applications such as that shown in FIG. 1, wired communication channel 103 behaves as a lossy channel for the high speed serial communications between source end-point 100 and destination end-point 101. In this architecture, retimer 104 is provided at destination end-point 101 to perform signal recovery and signal conditioning, including equalization to compensate for channel conditions of channel 103 and to reset the jitter "budget." In this example, retimer 104 receives high-speed wired serial communication signals transmitted by end-point 100 over channel 103, which may be realized as an optical, coaxial, or other wired communications facility. Retimer 104 recovers and conditions that received signal for forwarding to processing circuitry at destination end-point 101, for example destination ASIC 108 as shown in FIG. 1. The particular processing circuitry will, of course, depend on the function and architecture of destination end-point 101.

While FIG. 1 represents a simplified architecture for purposes of describing the context of the described embodiments, the overall architecture of the serial communications link will often include multiple retimers 104 along the communications link. The number and arrangement of retimers along the link will vary according to such factors as the network topology and the physical characteristics of the channels between the network nodes. For example, source end-point 100 may include its own retimer 104 downstream from host ASIC 102 to perform signal conditioning to compensate for losses within source end-point 100 prior to transmission over channel 103. Furthermore, the overall communications link may include multiple end-points, each including one or more retimers 104 for recovering and conditioning the signal along the link. And, of course, communications in the opposite direction (e.g., end-point 101 to end-point 100 in FIG. 1) will involve a retimer 104 at end-point 100 to condition the signal received over channel 103 from end-point 101. In any case, establishment of a communications link involves clock recovery and lane adaptation of retimer 104 along the signal path, and is typically carried out serially, for example in order from source to destination. Regardless of the number of retimers and other nodes along the signal path, modern communications technologies such as 5G wireless communications enforce an overall link establishment time for the entire link, within which the cumulative initialization processes of retimers 104, must be completed in sequence. For the example of 5G communications, the link establishment time should be less than 500 msec, including the time required for both phase lock in clock recovery and also lane adaptation at each retimer along the link.

Figure 2:
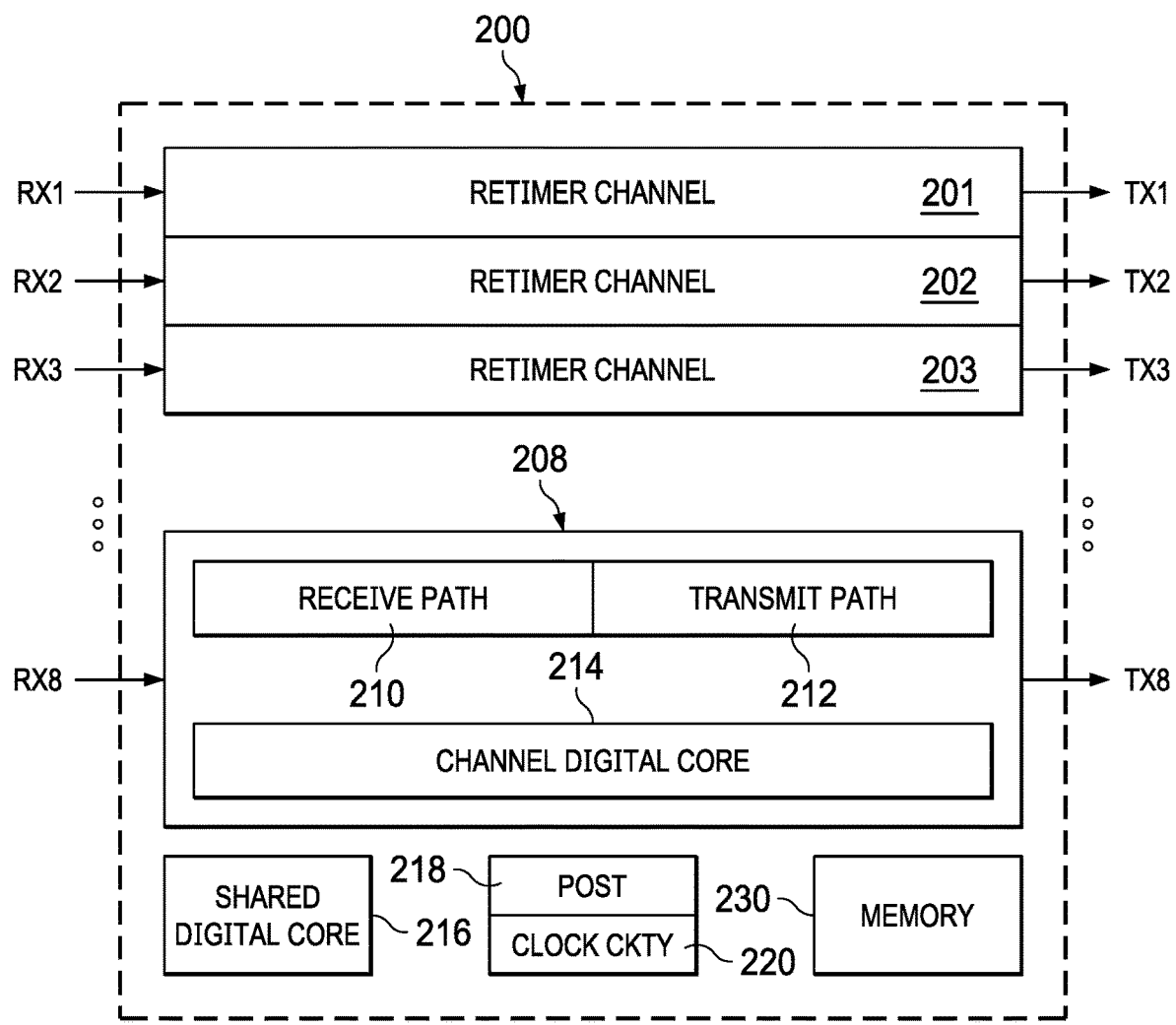
FIG. 2 is an electrical diagram, in block form, of a retimer in which embodiments may be implemented.

FIG. 2 illustrates the construction of retimer 200 according to an example of certain of the described embodiments. Retimer 200 of FIG. 2 may correspond to retimer 104 in the communications link of FIG. 1. In this example, retimer 200 receives serial communications over N multiple channels (such as RX1 through RX8 in FIG. 2), and in turn transmits serial communications over a corresponding N number of channels (such as TX1 through TX8 in FIG. 2). For the case of N=8 channels shown in FIG. 2, retimer 200 includes eight retimer channels 201, 202, 203, . . . , 208. Retimer channels 201, 202, 203, . . . , 208 are typically similarly constructed as one another. While this example illustrates eight channels, more or fewer channels may be utilized. The general construction of retimer channel 208 is shown in FIG. 2 as an example, with retimer channel 208 including receive path 210 receiving incoming signals on channel RX8 and transmit path 212 transmitting outgoing signals on channel TX8. The detailed functional architecture of receive path 210 according to an embodiment will be described in further detail below. Transmit path 212 may be constructed in the conventional manner, for example including the appropriate digital and analog filters, driver circuitry, and the like as known in the art. Retimer channel 208 also typically includes channel digital core logic 214, which represents digital logic circuitry for processing signals received on or to be transmitted from the channel RX8/TX8 associated with retimer channel 208. Retimer 200 may also include shared digital core 216, which represents digital logic for managing the overall operation of retimer 200. Other circuitry useful in the control and operation of retimer 200, such circuitry including power-on self-test 218, clock generator circuitry 220, and the like, may also be included as shown in FIG. 2. Retimer 200 according to this example also includes memory 230, which may include non-volatile memory for storing the program instructions or program code for execution by programmable logic such as channel digital core logic 214 in each channel 201 through 208, shared digital core 216, and by those portions of receive path 210 and transmit path 212 that are realized by programmable logic, and may also include volatile or non-volatile memory serving as data memory and register files. Memory 230 may be realized as a single memory as suggested by FIG. 2 or as distributed throughout retimer 200, and may be implemented according to any one or more of the available memory technologies and organizations.

Figure 3:
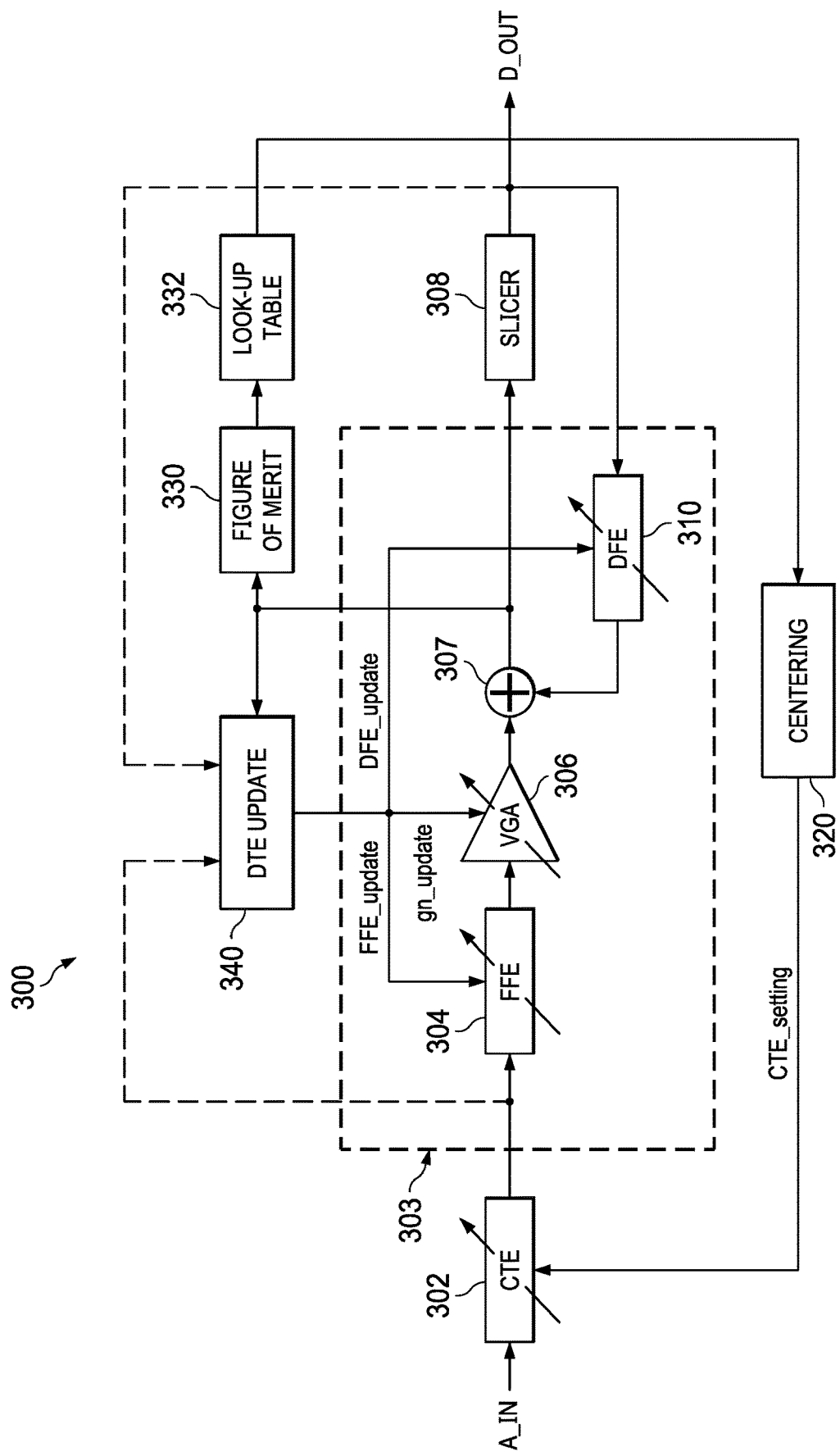
FIG. 3 is an electrical diagram, in block form, of a receive path in the retimer of FIG. 2 according to embodiments.

FIG. 3 illustrates the functional architecture of receive path 300 according to an example embodiment. This example embodiment of receive path 300 shown in FIG. 3 and described below may be implemented as receive path 210 in retimer channels 201 through 208 of retimer 200 shown in FIG. 2, in cooperation with the other components of retimer 200 in that architecture. As will be evident from the following description, receive path 300 may be realized as a combination of analog and digital circuitry to realize the analog and digital functions in this architecture. To the extent that receive path 300 is realized by digital circuitry, such digital circuitry may be implemented as custom or semi-custom logic, application specific logic circuitry or programmable logic, such as a digital signal processor, by general-purpose programmable logic, or a combination of these approaches. As noted above, memory 230 is provided in retimer 200, and perhaps in receive path 210 itself, to serve as program and data memory for these programmable logic functions.

As shown in FIG. 3, receive path 300 receives analog input A_IN at an input of continuous time equalizer (CTE) 302. Analog input A_IN corresponds to signal RX8 received by retimer 200 from a communications facility, after amplification and initial capacitive coupling by receiver circuitry in retimer 200 (not shown). CTE 302 in this embodiment is an adaptive analog filter that applies a filter characteristic selected from a set of multiple available filter characteristics in response to a digital value CTE_setting; the arrow through CTE 302 shown in FIG. 3 indicates that CTE 302 is an adaptive equalizer. Typically, CTE 302 is implemented as a linear equalizer, i.e., a continuous time linear equalizer (CTLE); for purposes of these embodiments, however, it is contemplated that the equalizer characteristic of CTE 302 need not be linear. Receive path 300 also includes a discrete time equalizer (DTE) 303, which may include either or both of a feed-forward equalizer (FFE) and decision feedback equalizer (DFE). Typically, DTE 303 is implemented as a linear equalizer, i.e., a discrete time linear equalizer (DTLE); for purposes of these embodiments, however, it is contemplated that the equalizer characteristic of DTE 303 need not be linear. In the example embodiment shown in FIG. 3, DTE 303 is realized by a combination of adaptive FFE 304, variable gain amplifier (VGA) 306, summing logic 307, and adaptive DFE 310. The arrows through FFE 304 and DFE 310 shown in FIG. 3 indicate that each is an adaptive equalizer. DTE 303 may be implemented using digital circuitry. For example, an analog-to-digital converter (ADC) may be used to digitize the signals from CTE 302, followed by digital filters implementing FFE 304 and DFE 310 implemented, for example, by a digital signal processor (DSP) or other processing logic circuitry. Alternatively, DTE 303 may be realized by analog circuitry. For example, FFE 304 and DFE 310 may include sample-and-hold stages, amplifiers (to apply the tap weights), and analog summers (to produce the filter output). In any case, the filtered signal that is output by CTE 302 is coupled (e.g., via a clock and data recovery function, not shown) to an input of FFE 304, which in turn applies a discrete time filter with tap weights selected according to a digital value FFE_update. The filtered output of FFE 304 is applied to an input of variable gain amplifier (VGA) 306, which amplifies that signal by a gain selected responsive to gain value gn_update and applies the amplified signal to a first input of summing circuit 307, which receives a feedback signal at a second input. Summing circuit 307 may be realized by adder circuitry, arithmetic logic operating according to program instructions, or the like. The output of summing circuit 307 is applied to slicer 308, which quantizes the output of summing circuit 307 to a digital symbol value and presents that symbol at digital output D_OUT. In this embodiment, DFE 310 receives the digital output D_OUT from slicer 308, applies a discrete time filter with tap weights selected responsive to a digital value DFE update, and presents the filtered output at the second input of summing circuit 307. Summing circuit 307 thus provides a summed signal constituting the output of VGA 306 plus a feedback signal from DFE 310 and presents this summed signal to slicer 308 for demodulation and quantization to a digital symbol value presented at digital output D_OUT.

According to this embodiment, the continuous time and discrete time equalizers are not individually adapted, such as in a sequential or iterative manner as in conventional retimers, but rather are jointly adapted, such that the adaptation of the discrete time equalizer (e.g., DTE 303 in FIG. 3) informs the adaptation of the continuous time equalizer (e.g., CTE 302) and vice versa. In receive path 300 in the example embodiment of FIG. 3, centering logic 320, figure of merit (FOM) calculation logic 330, an optional look-up table (LUT) 332, and discrete time equalizer (DTE) update logic 340 perform such joint adaptation of CTE 302 and DTE 303. As mentioned above, it is contemplated that centering logic 320, FOM logic 330, LUT 332, and DTE update logic 340 may be implemented as digital logic, for example partially or wholly realized in channel digital core logic 214 (FIG. 2). In the example embodiment of FIG. 3, the output of summing logic 307 is also received at FOM logic 330 for determination (e.g., with LUT 332) of a measure of signal quality based on one or more attributes of the signal levels output by summing logic 307. The output of FOM logic 330 is applied, via LUT 332 in this example, to centering logic 320, which generates a value on CTE_setting that is applied to CTE 302 to set its filter characteristic.

DTE update logic 340 is logic circuitry that updates control values FFE_update, gn_update, and DFE update for application to FFE 304, VGA 306, and DFE 310 in the adaptation of DTE 303. According to embodiments described in further detail below, DTE update logic adapts DTE 303 in response to a measurement of error in the equalizing performed by DTE 303 at its current tap weights or other settings; more specifically, DTE 303 performs such DTE adaptation in some embodiments based on a gradient of that error. As such, DTE update logic 340 receives one or more inputs from along the signal path on either side of DTE 303, for example from one or more of the outputs of summing logic 307 as input to slicer 308, from the output of slicer 308, and the output of CTE 302 as input to FFE 304.

Figure 4:
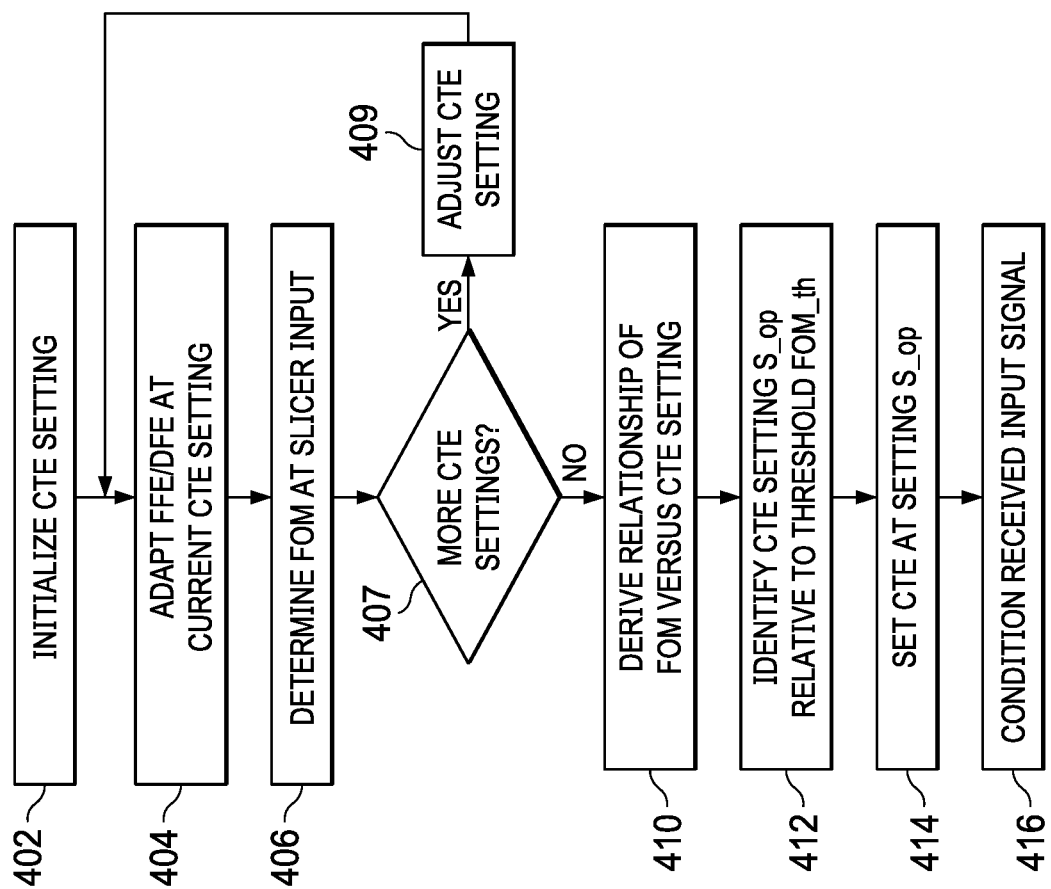
FIG. 4 is a flow diagram illustrating the adaptation operation of the receive path of FIG. 3, according to embodiments.

FIG. 4 illustrates an example of the operation of centering logic 320, FOM logic 330, LUT 332, and DTE update logic 340 in carrying out joint adaptation of CTE 302 and DTE 303 in receive path 300 of FIG. 3 according to an example embodiment. It is contemplated that the joint adaptation of CTE 302 and DTE 303 according to this embodiment will be initiated and performed under the control of channel digital core logic 214 for retimer channel 208, for example by executing program instructions stored in memory 230 arranged to cause centering logic 320, FOM logic 330, LUT 332, and DTE update logic 340 to perform the operations of FIG. 4. In this embodiment, CTE 302 can be set to any one of a number of possible settings (i.e., values of CTE_setting), each corresponding to a different analog filter characteristic applied by CTE 302. For example, thirty-two different analog filter characteristics may be used to select one of thirty-two filter characteristics for CTE 302. It is contemplated that the characteristics of CTE 302 will generally vary monotonically with values of CTE_setting. For example, the gain of CTE 302 may increase with increasing CTE_setting values. In this example, this joint adaptation operation begins with process 402, in which CTE 302 is set at an initial CTE_setting value; the particular value applied as an initial value in process 402 is not of importance, as the adaptation of CTE 302 will iteratively step through multiple CTE_setting values.

Once CTE 302 is set to an initial setting in process 402, adaptation process 404 is then performed to adapt DTE 303 under the condition of the filter characteristic of CTE 302 that corresponds to the initial value of CTE_setting set in process 402. Examples of adaptation process 404 performed by DTE update logic 340 according to certain embodiments will be described in further detail below. Alternative iterative DTE adaptation methods (e.g., using a "gear shift" approach to change the bandwidth of adaptation from an initial high value to a lower steady-state value after a selected number of iterations) may instead be used to adapt DTE 303 in process 404. In any case, this first pass of process 404 optimizes both FFE 304 and DFE 310 with CTE 302 applying a filter characteristic corresponding to its initial CTE_setting value.

Figure 5B:
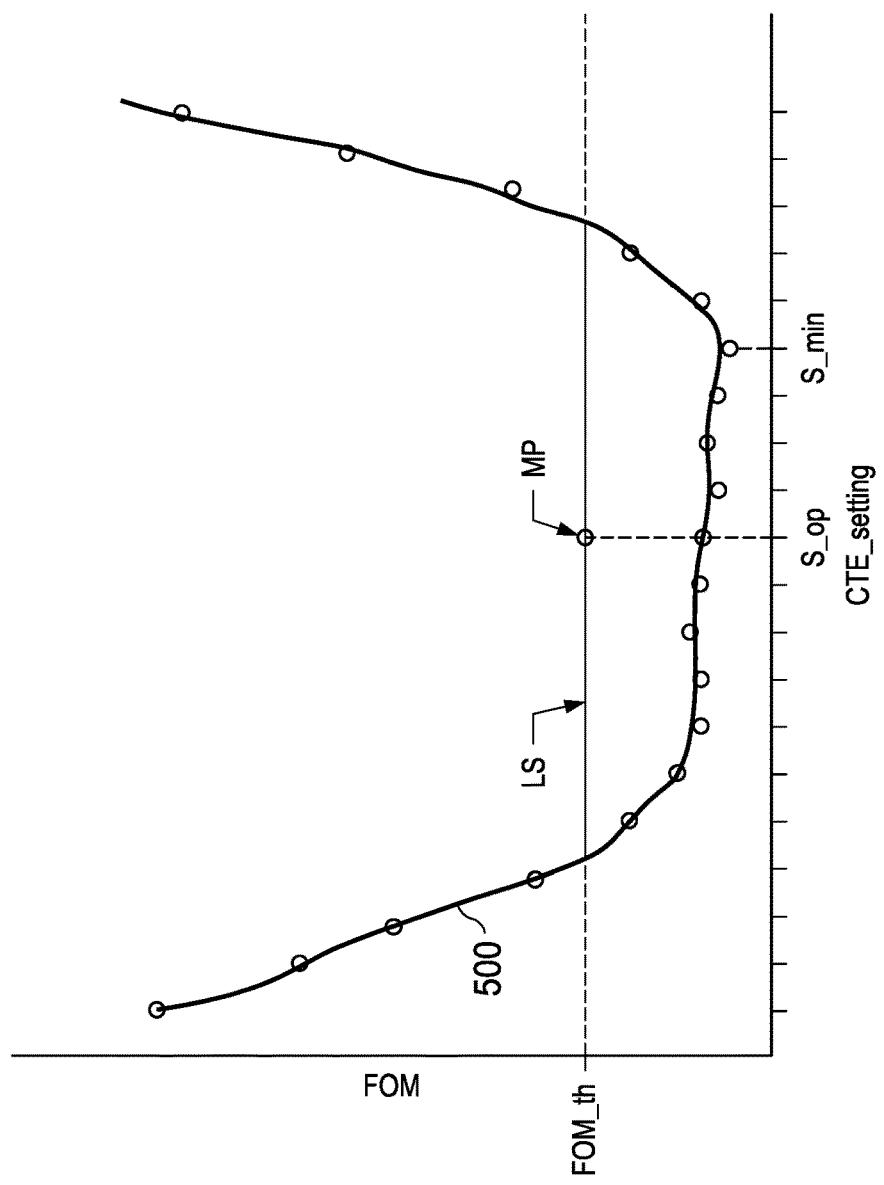
FIG. 5B, FIG. 5C, and FIG. 5D are plots of figure of merit vs. continuous time equalizer settings, illustrating selection of an adaptation setting according to embodiments.
Figure 5A:
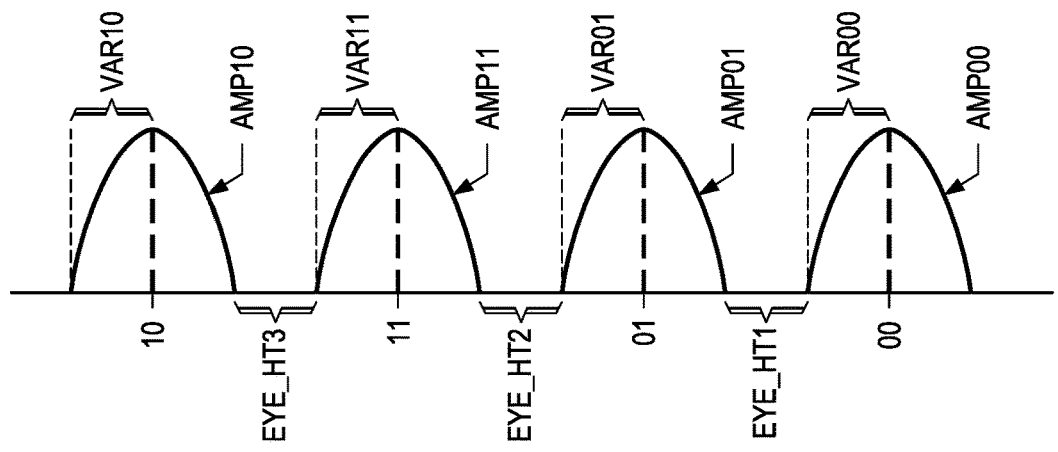
FIG. 5A is a plot of signal levels according to PAM4 modulation, illustrating examples of a figure of merit according to embodiments.

Once DTE 303 in receive path 300 is adapted at the initial setting of CTE 302 in this first pass of process 404, a figure of merit (FOM) is then determined for this joint adaptation iteration in process 406 by FOM logic 330 and LUT 332. According to this example embodiment, the FOM is a measure of the quality of the signal at the input of slicer 308 (i.e., at the output of summing logic 307). The well-known "eye" diagram of superimposed signal transitions between logic 1 and 0 levels is an example of a measure of the quality of data recovery in a receive path, as it reflects data-dependent noise and jitter. According to embodiments, FOM determination process 406 can be made in any one of a number of ways, two of which are illustrated in FIG. 5A. The vertical axis of FIG. 5A depicts the amplitude levels of the four possible data symbol values of PAM4 modulation, namely "00", "01", "11", and "10" in order of increasing Gray-coded amplitude, with plots AMP00, AMP01, AMP11, AMP10, respectively. These plots AMP00, AMP01, AMP11, AMP10 plot the actual sampled amplitudes of received signals as processed by CTE 302 at its current CTE_setting value and DTE 303 (FFE 304, VGA 306, and DFE 310) adapted to convergence for signals filtered by CTE 302 at that setting. One way of determining FOM in process 406 is for FOM logic 330 to measure distances EYE_HT1, EYE_HT2, and EYE_HT3 shown in FIG. 5A between adjacent ones of plots AMP00, AMP01, AMP11, AMP10, these distances corresponding to the "eye height" in the corresponding "eye" diagram at this adaptation point. Alternatively, as also shown in FIG. 5A, a measure of variances VAR00, VAR01, VAR11, VAR10 in plots AMP00, AMP01, AMP11, AMP10, relative to the ideal levels 00, 01, 11, 10, respectively, may be determined by FOM logic 330 in process 406. LUT 332 may be provided to convert the measure or measures generated by FOM logic 330 into a FOM value, normalized as desired for the joint adaptation process of this example embodiment, if FOM logic 330 does not itself directly calculate the FOM value. It is contemplated that other approaches to calculating an FOM from the signal at the output of summing logic 307 can alternatively be used in process 406.

Following the determination of FOM for the adapted DTE 303 with CTE 302 at its initial CTE_setting value, decision 407 determines whether more CTE_setting values remain to be considered in the joint adaptation of receive path 300. If so (decision 407 returns a "yes" result), the value of CTE_setting is adjusted in process 409 to change the filter characteristic (e.g., analog filter characteristic) of CTE 302, and DTE 303 is again adapted in another pass of process 404 at the adjusted value of CTE_setting, followed by calculation of an FOM value for that adjusted CTE_setting in a next pass of process 406. This loop of processes 404, 406 and decision 407 (with CTE_setting adjustment process 409) is continued until no more CTE_setting values are to be considered, as indicated by decision 407 returning a "no" result. It is contemplated that this loop will typically be performed for each of the available values of CTE_setting; alternatively, fewer than the entire set of available values may be measured if desired to reduce lane adaptation time.

Following the determination of an FOM value for each CTE_setting value to be considered (decision 407 returns "no"), centering logic 320 or other appropriate logic in receive path 300 derives a relationship of FOM value versus CTE_setting, in process 410. The form in which the relationship of FOM to CTE_setting is derived in process 410 can vary, depending on the logic (e.g., digital logic) or algorithm used to realize centering logic 320 or other logic in receive path 300. Curve 500 in FIG. 5B illustrates an example of the relationship of FOM value versus CTE_setting derived in process 410 of FIG. 4 for an example of receive path 300. In the plot of FIG. 5B, lower FOM values correspond to better quality of data recovery from the received signal, and the discrete values of CTE_setting correspond to discrete filter characteristics applied by CTE 302. In this example, individual points along curve 500 represent the FOM value for signals received during lane adaptation, as conditioned by CTE 302 and DTE 303 at the best adaptation of DTE 303 for a given CTE_setting value. In the example shown in FIG. 5B, the filter characteristics of CTE 302 set by extreme low and high values of CTE_setting (e.g., at low and high CTE gain) result in poor (i.e., high) FOM values, while the mid-range values of CTE_setting provide much better (i.e., lower) FOM values. In particular, it is contemplated that DTE architectures including both an FFE and a DFE 310, as in this example embodiment of FIG. 3, will often exhibit a flat region of FOM over mid-range values of CTE_setting as in curve 500 in FIG. 5B.

In process 412, centering logic 320 analyzes the relationship of FOM to CTE_setting derived in process 410 to identify an optimal value of CTE_setting to be used by receive path 300. It is contemplated that centering logic 320 will typically perform this process 410 numerically in the appropriate manner for its logic realization. FIG. 5B illustrates an example of one approach used to perform process 412 according to an embodiment, for the case in which the FOM relationship determined in process 410 exhibits a generally flat FOM region. According to this approach, a threshold value FOM_th of acceptable FOM values is identified, either as may be predetermined or as derived from the relationship identified in process 410, and a line segment LS is defined between two points at which curve 500 crosses threshold value FOM_th. The CTE_setting value S_op that is closest to the midpoint MP of this line segment LS is then selected in process 414 for application to CTE 302 as the value of CTE_setting.

Figure 5C:
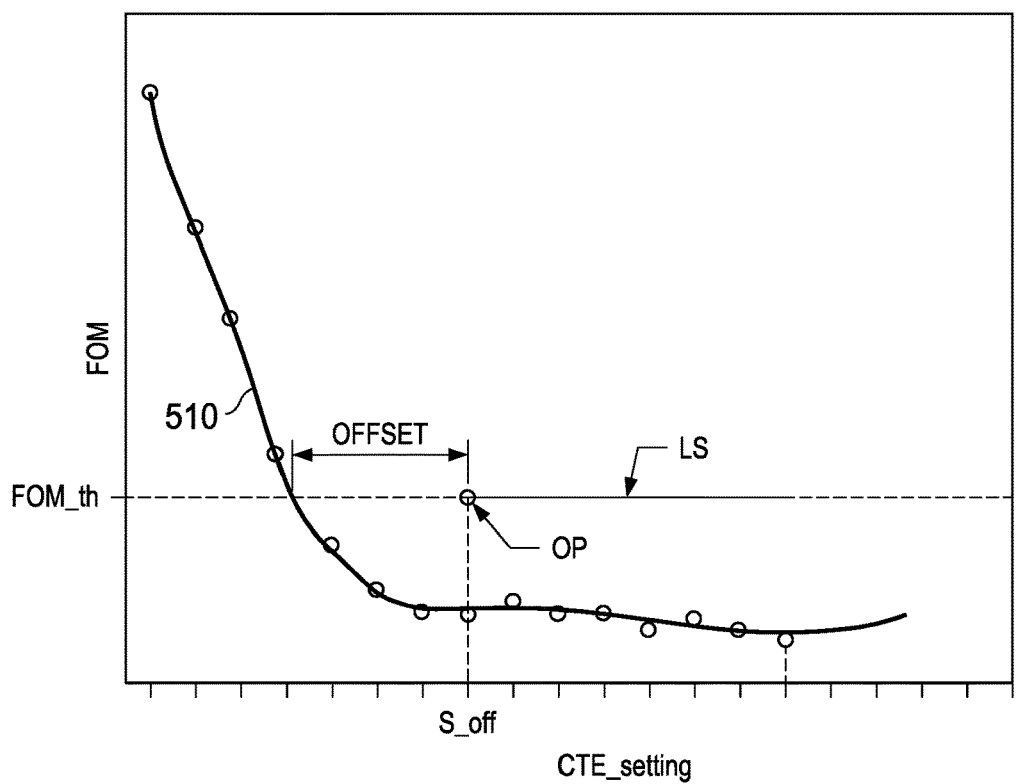
Figure 5D:
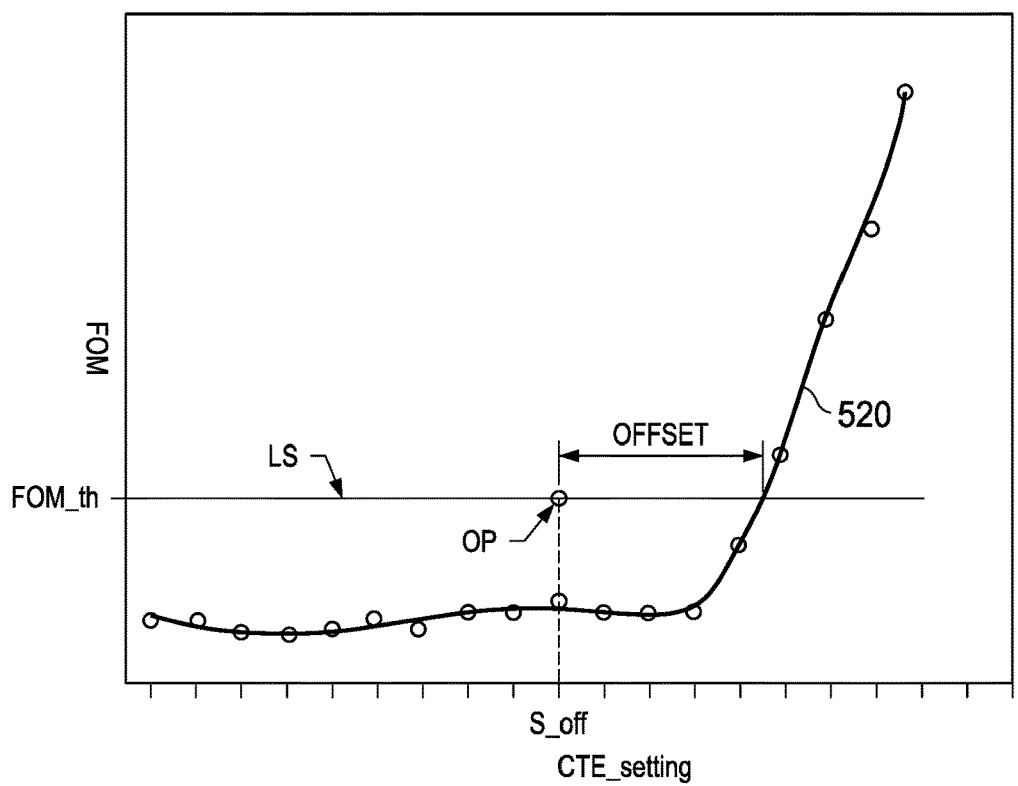

Alternative approaches for performing process 412 are also contemplated, particularly as may be useful for those channels that do not exhibit a flat center FOM region such as shown in FIG. 5B. For example, a high loss channel may exhibit FOM characteristic 510 shown in FIG. 5C, in which the FOM is poor at low CTE_setting values (e.g., CTE 302 at a low gain), but does not degrade at higher CTE_setting values (e.g., CTE 302 at high gain). Conversely, a low loss channel may exhibit FOM characteristic 520 shown in FIG. 5D, in which the FOM is good with CTE 302 at a low gain CTE_setting values, but degrades as the gain of CTE 302 increases at higher CTE_setting values (CTE 302 at high gain). In either of these cases, the FOM characteristic 510, 520 intersects threshold FOM_th at only one point, preventing centering logic 320 from identifying a midpoint MP in process 412 as in the case of FIG. 5B. According to an embodiment, if centering logic 320 identifies in process 410 that FOM characteristic is single-sided, such as in FIG. 5C and FIG. 5D, in deriving the relationship of FOM value versus CTE_setting in process 410, centering logic 320 identifies CTE_setting value S_op in process 412 as a CTE_setting value that is at or closest to a predetermined offset (in CTE_setting values) from the single intersection of the FOM characteristic 510, 520 with threshold FOM_th. This CTE_setting value S_op, based on an offset from the FOM_th intersection point, is then applied to CTE 302 as the CTE_setting value in process 414.

It is recognized that the value S_op identified in process 414 according to this embodiment may not necessarily correspond to the true optimum joint adaptation. For example, referring to FIG. 5B, the true optimum (i.e., lowest) FOM is attained at CTE_setting value S_min. However, the selection of CTE_setting value S_op as the midpoint of a line segment between intersections of the FOM characteristic and an FOM threshold (as in FIG. 5B), or at a point that is offset from an intersection of the FOM characteristic with the FOM threshold (as in FIG. 5C and FIG. 5D), ensures that the operating point of CTE 302 will have some operating margin, and thus tolerance to some channel variation, drift, or temperature or other environmental changes, etc. before the signal conditioning performance of retimer channel 300 significantly degrades.

Upon selection of the desired CTE_setting value in process 414, this CTE_setting value is applied to CTE 302 along with the tap weights of FFE 304 and DFE 310 (and gain value of VGA 306) determined in the adaptation of DTE 303 at that CTE_setting value in process 404. Lane adaptation of receive path 300 is then complete, and conditioning of input signals received over established communication link is performed in process 416.

As discussed above, conventional algorithms may be used in DTE adaptation process 404 to adapt DTE 303. But because process 404 is performed at each CTE_setting value, this iterative adaptation of DTE 303 using conventional discrete time filter adaptation algorithms can consume significant computational time. Especially in 5G and other applications in which the lane adaptation time is very constrained, it is beneficial to accelerate DTE adaptation process 404. According to certain embodiments, as will now be described relative to FIG. 6 through FIG. 8, a gradient descent adaptation process can be used in process 404 to reduce the time and computation required for adaptation of DTE 303, while also providing the capability of re-adaptation post-initialization.

Figure 6:
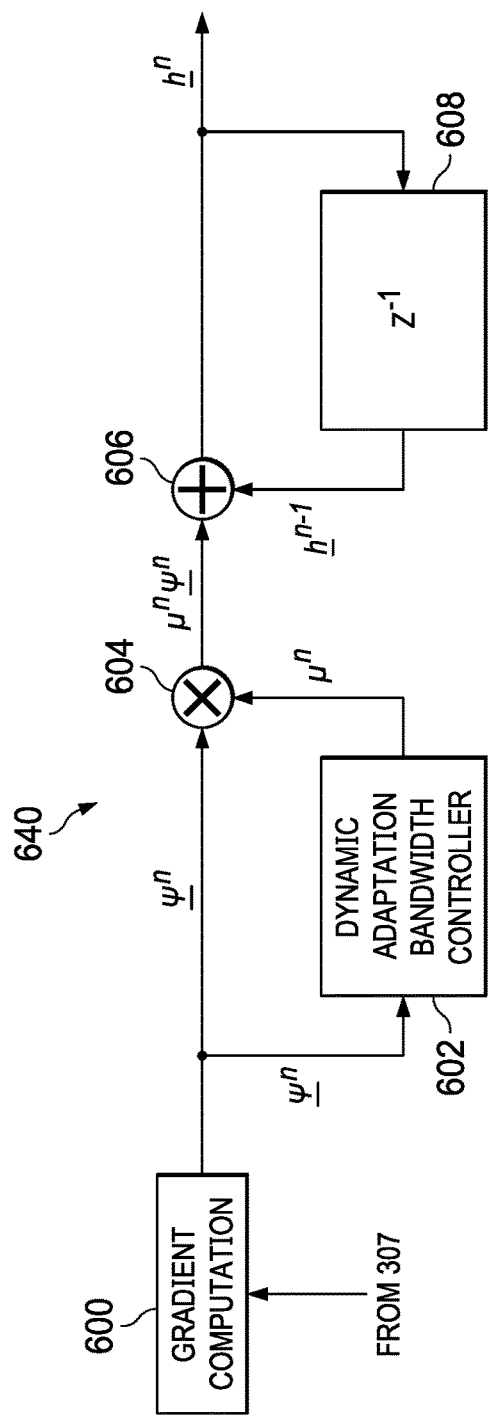
FIG. 6 is an electrical diagram, in block form, of a discrete time equalizer update logic in the receive path of FIG. 3, according to embodiments.

FIG. 6 illustrates DTE update logic 640, according to which DTE update logic 340 of FIG. 3 may be constructed according to certain embodiments. As shown in FIG. 6, gradient computation logic 600 is logic circuitry that receives the output of summing logic 307 and computes an error gradient $\Psi^n$ for the current output of summing logic 307 for the $n^{th}$ iteration (i.e., $n^{th}$ output sample) relative to a previous iteration (e.g., iteration n−1), in the manner for least mean squares (LMS) minimization. Error gradient $\Psi^n$ is a vector of components corresponding to the tap weight values being adjusted. This error gradient $\Psi^n$ is applied to dynamic adaptation bandwidth controller 602, which according to this embodiment is logic circuitry that calculates a convergence coefficient $\mu^n$ for the current $n^{th}$ iteration of DTE adaptation. Convergence coefficient $\mu$ represents a "bandwidth of adaptation," in that a relatively large convergence coefficient μ causes a large incremental change in the tap weights of DTE 303 (e.g., for FFE 304 and DFE 310), while a relatively small convergence coefficient μ results in a smaller incremental change in those tap weights. The current error gradient $\Psi^n$ from gradient computation logic 600 and the calculated convergence coefficient $\mu^n$ from dynamic adaptation bandwidth controller 602 are applied to inputs of multiplier 604, which produces a product $\mu^n \Psi^n$ that is applied to an input of summing logic 606. Summing logic 606 derives a vector $h^n$ of tap weights for DTE 303 for the current $n^{th}$ adaptation iteration as a sum of the current value of product $\mu^n \Psi^n$ and the tap weight vector $h^{n-1}$ from the previous iteration n−1:

$$h^n = \mu^n(\Psi^n) + h^{n-1} \quad (1)$$

Figure 7:
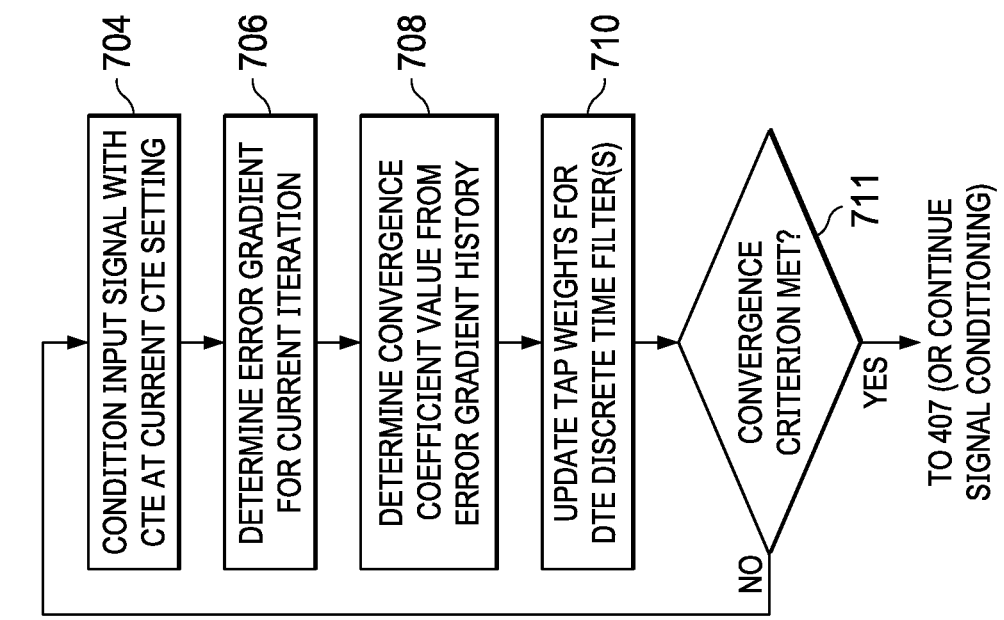
FIG. 7 is a flow diagram illustrating the adaptation of the discrete time equalizer in the receive path of FIG. 3 according to embodiments.

FIG. 7 illustrates the operation of DTE update logic 640 in adapting DTE 303 according to embodiments; this operation may be performed either during link establishment, for example in the process of FIG. 4, or post-initialization to re-adapt DTE 303 as channel conditions may change over time. If receive path 300 is currently performing lane adaptation, in which case the operation of FIG. 7 is being performed in an iteration of process 404 (FIG. 4), DTE 303 is initialized to set tap weights of FFE 303 and DFE 310 and the gain of VGA 306, to some initial condition for purposes of adaptation. If, on the other hand, the communications link has already been established through receive path 300, such that the DTE update of FIG. 7 is carrying out continuous or periodic re-adaptation, FFE 303 and DFE 310 will already have their tap weights set to some previously adapted values. In either case, an input signal is conditioned by CTE 302 and DTE 303 with CTE 302 at its current CTE_setting value in process 704. In process 706, gradient computation logic 600 of DTE update logic 640 computes a current error value based on the results of the signal conditioning of process 704 and, from that current error value and a previous error value, computes a current error gradient vector $\Psi^n$ in process 706.

In process 708, dynamic adaptation bandwidth controller 602 calculates a current value of convergence coefficient $\mu^n$. According to certain embodiments, dynamic adaptation bandwidth controller 602 uses the history of the error gradient $\Psi^n$ computed by gradient computation logic 600 in at least one previous iteration to determine the value of convergence coefficient $\mu^n$ for the current iteration in process 708. This dynamic control of the bandwidth of adaptation can thus be applied both during link establishment (i.e., initialization), and also during post-initialization operation to re-adapt receive path 300 should channel conditions change over time.

Figure 8:
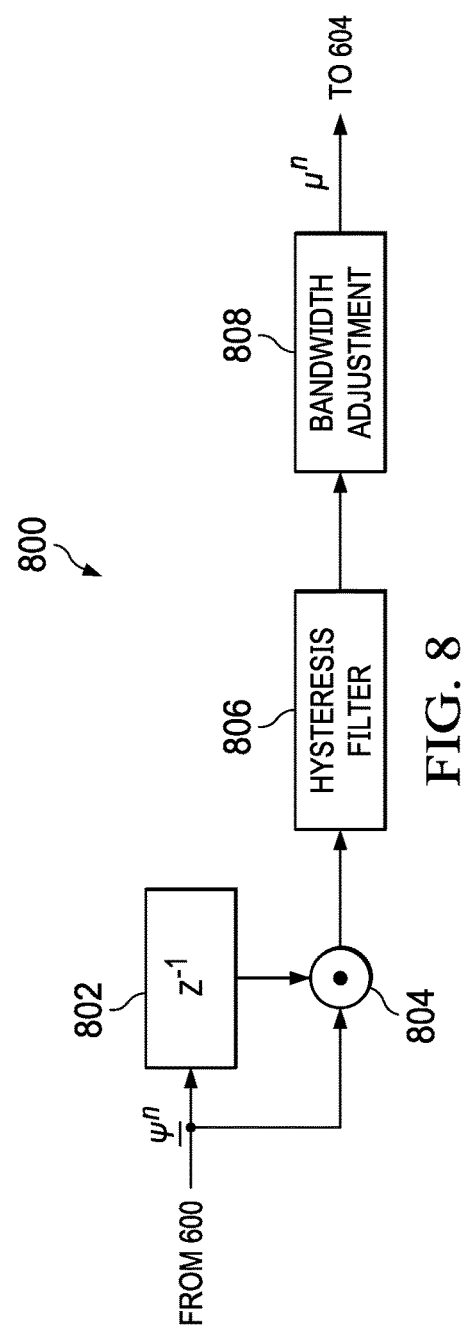
FIG. 8 is an electrical diagram, in block form, of a dynamic adaptation bandwidth controller in the DTE update logic of FIG. 6, according to embodiments.

FIG. 8 illustrates the construction of dynamic adaptation bandwidth controller 800, as may be used to implement dynamic adaptation bandwidth controller 602 for performing the determination of convergence coefficient μ in process 708 according to embodiments. Dynamic adaptation bandwidth controller 800 receives the error gradient $\Psi^n$ for the $n^{th}$ adaptation or signal conditioning iteration from gradient computation logic 600 and applies that error gradient $\Psi^n$ to delay stage 802 and to an input of dot product logic 804; another input of dot product logic 804 receives the delayed error gradient $\Psi^{n-1}$ from the previous iteration from delay stage 802. Dot product logic 804 represents computational logic circuitry for performing the dot product (i.e., inner product) of the error gradient vectors $\Psi^n$ and $\Psi^{n-1}$, typically as a sum of the products of the corresponding vector components. The output of dot product logic 804, as may be filtered by hysteresis filter 806, is applied to bandwidth adjustment logic 808, which in turn generates convergence coefficient $\mu^n$ for the current $n^{th}$ iteration from the filtered dot product output. While the dot product of two vectors has both a magnitude and a sign, the dot product magnitude in the context of adaptive equalization may be more indicative of signal strength than of convergence of the adaptive equalizer. According to these embodiments, the sign of the dot product of error gradient vectors $\Psi^n$ and $\Psi^{n-1}$ provides an indication of the extent to which the adaptation of receive path 300 has converged, and is used in the adjustment of the convergence coefficient μ according to these embodiments.

The determination of convergence coefficient $\mu^n$ by bandwidth adjustment logic 808 may be performed in various ways. According to one embodiment, bandwidth adjustment logic 808 uses the sign of the dot product of error gradient vectors $\Psi^n$ and $\Psi^{n-1}$ computed by dot product logic 804. A negative dot product result indicates that the current error gradient $\Psi^n$ has changed direction from the error gradient $\Psi^{n-1}$ in the previous iteration, from which it can be inferred that adaptation of receive path 300 is nearing convergence; on the other hand, a positive dot product result indicates that the current error gradient $\Psi^n$ is in the same direction as the previous iteration error gradient $\Psi^{n-1}$, indicating that adaptation is not yet near convergence. In this embodiment, bandwidth adjustment logic 808 decreases convergence coefficient $\mu^n$ by an increment to decrease the bandwidth of adaptation in response to a negative dot product result. Conversely, bandwidth adjustment logic 808 incrementally increases convergence coefficient $\mu^n$ to increase the bandwidth of adaptation and accelerate convergence in response to a positive dot product result.

According to another embodiment, the time and power required to dynamically adapt the bandwidth of adaptation by controller 800 can be reduced by implementing dot product logic 804 and bandwidth adjustment logic 808 to consider only the largest amplitude component (i.e., the FFE and DFE tap weight with the largest error) of the error gradient vectors $\Psi^n$ and $\Psi^{n-1}$ rather than compute the full dot product. In this embodiment, dot product logic 804 identifies the largest amplitude component of the error gradient vectors $\Psi^n$ and $\Psi^{n-1}$, and bandwidth adjustment logic 808 determines whether the sign of that error gradient vector component in the current iteration n has changed from its sign in the previous iteration n−1. If so, adaptation of receive path 300 is nearing convergence, and bandwidth adjustment logic 808 incrementally decreases convergence coefficient $\mu^n$; conversely, if the sign of the largest error gradient vector component is the same in the current $n^{th}$ iteration as in the previous iteration, adaptation is not near convergence, and bandwidth adjustment logic 808 to increase the change in the filter tap weights to accelerate convergence.

As noted above, hysteresis filter 806 can be included in the embodiment of dynamic adaptation bandwidth controller 800 shown in FIG. 8 to provide stability to the adaptation. Hysteresis filter 806 may apply a low-pass filter characteristic to the dot product (sign) result from dot product logic 804 to reduce the frequency of changes in the bandwidth applied by bandwidth adjustment logic 808. According to another approach, hysteresis filter 806 may require either a negative or positive dot product result to exceed a certain magnitude before causing bandwidth adjustment logic 808 to make any adjustment in the convergence coefficient $\mu^n$. It is contemplated that those skilled in the art having reference to this specification will be readily able to implement a hysteresis filter 806 (for example by way of a digital filter implemented using a processor, ASIC, field-programmable gate array, or the like) as desired for a particular implementation.

Referring back to FIG. 7, following the determination of convergence coefficient $\mu^n$ in process 708, DTE update logic 640 updates the tap weights of the discrete time filters of FFE 303 and DFE 310, and also possibly the gain of VGA 306, based on the error gradient and a convergence coefficient. As described above for the embodiment shown in FIG. 6, error gradient vector $\Psi^n$ from gradient computation logic 600 and convergence coefficient $\mu^n$ from dynamic adaptation bandwidth controller 602 are applied to inputs of multiplier 604 to generate the product $\mu^n\Psi^n$ for summing with the tap weight vector $h^{n-1}$ from the previous iteration n−1 at summing logic 606, to produce the updated tap weight vector $h^n$ as discussed above. Following that update of tap weights, DTE update logic 640 determines whether a convergence criterion has been met in decision 711. The particular convergence criterion (or criteria) applied in decision 711 may be of conventional type, such as minimization of mean error or mean squared error to within a preselected threshold limit, or whether a predetermined number of iterations of DTE adaptation has been performed. If the convergence criterion is not met (decision 711 returns "no"), another iteration of DTE adaptation is performed beginning again with process 704. Once convergence is attained (decision 711 returns "yes), DTE 303 is adapted for the current value of CTE_setting, and lane adaptation can continue from process 407 (FIG. 4) if receive path 300 is currently in link establishment, or the conditioning of incoming signals can continue if the communications link through receive path 300 is carrying actual traffic.

According to these embodiments, the bandwidth of adaptation can be dynamically controlled and adjusted continuously, not only at link establishment or initialization. This ability allows receive path 300 to readily re-adapt to changes in channel conditions, whether such changes are relatively slow such as due to temperature or low frequency jitter variations, or relatively fast due to time-varying interference levels, data multiplexer changes, or the like.

While the gradient descent adaptation process described above relative to FIG. 6 through FIG. 8 can be used in the joint adaptation process of FIG. 4 as described above, it is also contemplated that this gradient descent adaptation process and architecture can be used for adaptation of discrete time equalizers in other applications, including those not involving the joint adaptation of a CTE and DTE as described above. In either case, the gradient descent adaptation process described above is contemplated to reduce the time and computation required for adaptation of FFE- and DFE-based equalizers, while also providing the capability of re-adaptation in response to post-initialization changes in channel conditions.

As noted above, embodiments have been described in the context of a retimer in a modern 5G wireless cellular system, in which end-points 100, 101 correspond to network nodes such as a wireless base station, switch fabric, or other network function. It is contemplated that these embodiments may also be applied to other types of communications networks, for example in the context of high-speed Ethernet (e.g., those with 200G/400G data rates) in which case end-points 100, 101 may correspond to clients, servers, or other network nodes that may be realized by a computer or computer-controlled sensor, controller, or other device, with system 102 through which a communication link between end-points 100, 101 is made corresponding to routers, switches, and other network infrastructure elements. Realization of the disclosed embodiments in these and other communications systems and implementations are contemplated to be understood and realized by those skilled in the art having reference to this specification.

According to the embodiments described above, several important technical effects can be obtained. The joint adaptation of a continuous time equalizer with a discrete time equalizer described above enables the ability to obtain a robust setting for the continuous time equalizer in a non-iterative manner. Such joint adaptation that also includes adaptive control of the bandwidth of adaptation in adaptation of the discrete time equalizer has been observed to greatly reduce the adaptation time of adaptive equalizer circuitry including both continuous time and discrete time equalizers to on the order of 12 msec. In the context of a retimer in high-speed serial communications, this performance enables an overall lane initialization time of below 50 msec as consistent with the desired initialization time for modern high-speed serial communication technologies such as 5G.

The term "couple", as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

Unless otherwise stated, "about," "approximately," or "substantially" preceding a value means+/−10 percent of the stated value. Modifications are possible in the described examples, and other examples are possible within the scope of the claims.

While one or more embodiments have been described in this specification, it is of course contemplated that modifications of, and alternatives to, these embodiments, such modifications and alternatives capable of obtaining one or more the technical effects of these embodiments, will be apparent to those of ordinary skill in the art having reference to this specification and its drawings. It is contemplated that such modifications and alternatives are within the scope of the claims presented herein.

What is claimed is:
1. Adaptive equalizer circuitry, comprising:
   a continuous time equalizer (CTE) adapted to filter a received input signal according to a filter characteristic selected from a plurality of filter characteristics responsive to a CTE setting;

a discrete time equalizer (DTE), having an input coupled to an output of the CTE, and including at least one discrete time filter having a plurality of tap weights;
a slicer, having an input coupled to an output of the DTE, for presenting at an output a quantized digital symbol value corresponding to a signal from the output of the DTE; and
logic circuitry adapted to jointly adapt the CTE and DTE by performing a plurality of operations comprising:
for each of a plurality of values of the CTE setting:
adapting the DTE by adjusting tap weights of the at least one discrete time filter according to an error minimization;
determining a figure of merit for an input signal filtered by the CTE at the CTE setting value and the adapted DTE in combination; and
selecting one of the plurality of values of the CTE setting responsive to the figure of merit values; and
conditioning received input signals with the CTE at the selected setting value and the adapted DTE for that selected CTE setting value.

2. The adaptive equalizer circuitry of claim 1, wherein the DTE includes:
a feed-forward equalizer (FFE) comprising a discrete time filter having a plurality of tap weights, the FFE having an input coupled to receive the output of the CTE.

3. The adaptive equalizer circuitry of claim 1, wherein the DTE includes:
a decision-feedback equalizer (DFE) comprising a discrete time filter having a plurality of tap weights, the DFE having an input coupled to receive the output of the DTE.

4. The adaptive equalizer circuitry of claim 1, wherein the DTE comprises:
a feed-forward equalizer (FFE) comprising a discrete time filter having a plurality of tap weights, the FFE having an input coupled to receive the output of the CTE, and having an output;
a decision-feedback equalizer (DFE) comprising a discrete time filter having a plurality of tap weights, the DFE having an input coupled to receive the output of the DTE, and having an output; and
summing logic, having a first input coupled to receive a signal from the output of the FFE and a second input coupled to receive a signal from the output of the DFE;
wherein an output of the summing logic is coupled to the input of the slicer.

5. The adaptive equalizer circuitry of claim 4, wherein the DTE further comprises:
a variable gain amplifier having an input coupled to the output of the FFE and an output coupled to the first input of the summing logic, the variable gain amplifier applying a gain selected in the adapting of the DTE.

6. The adaptive equalizer circuitry of claim 1, wherein the logic circuitry comprises centering logic adapted to perform the operation of the selecting one of the plurality of values of the CTE setting responsive to the figure of merit values by:
determining a relationship of figure of merit value versus CTE setting value;
determining, from the relationship, a range of CTE setting values having figure of merit values better than a threshold level; and
selecting, for use in conditioning received input signals, a CTE setting value near a midpoint of the range.

7. The adaptive equalizer circuitry of claim 1, wherein the logic circuitry comprises centering logic adapted to perform the operation of the selecting one of the plurality of values of the CTE setting responsive to the figure of merit values by:
determining a relationship of figure of merit value versus CTE setting value; and
selecting, for use in conditioning received input signals, a CTE setting value at an offset from a value at which the relationship indicates a crossing of a threshold level.

8. The adaptive equalizer circuitry of claim 1, wherein the logic circuitry comprises DTE update logic adapted to perform the operation of adapting the DTE for each of the plurality of CTE setting values by:
determining an error gradient from an output of the slicer in a current iteration;
determining a convergence coefficient from the error gradient in a current iteration and an error gradient from a previous iteration;
adjusting tap weights of the at least one discrete time filter from a previous iteration responsive to a product of the convergence coefficient and the error gradient from the current iteration; and
repeating the determining and updating operations until a convergence criterion is met.

9. The adaptive equalizer circuitry of claim 8, wherein the DTE update logic comprises a dynamic adaptation bandwidth controller adapted to determine the convergence coefficient by:
determining a dot product of the error gradient in the current iteration with the error gradient from the previous iteration;
responsive to the dot product having a negative value, decreasing the convergence coefficient from its value in a previous iteration; and
responsive to the dot product having a positive value, increasing the convergence coefficient from its value in the previous iteration.

10. The adaptive equalizer circuitry of claim 9, wherein the dynamic adaptation bandwidth controller is further adapted to determine the convergence coefficient by:
prior to either of the steps of increasing or decreasing the convergence coefficient, applying a hysteresis filter to the dot product of the error gradient in the current iteration with the error gradient from the previous iteration.

11. The adaptive equalizer circuitry of claim 8, wherein the dynamic adaptation bandwidth controller is further adapted to determine the convergence coefficient by:
identifying a largest amplitude component of the error gradients in the current iteration and from the previous iteration;
responsive to the sign of the largest amplitude component changing from the previous iteration to the current iteration, decreasing the convergence coefficient from its value in a previous iteration; and
responsive to the sign of the largest amplitude component not changing from the previous iteration to the current iteration, increasing the convergence coefficient from its value in the previous iteration.

12. A method of performing lane adaptation for adaptive equalizer circuitry in a serial communications channel, the adaptive equalizer circuitry comprising a continuous time equalizer (CTE) and a discrete time equalizer (DTE), the method comprising:
for each of a plurality of values of a CTE setting, responsive to which a filter characteristic of the CTE is selected:

adapting the DTE by adjusting tap weights of at least one discrete time filter in the DTE according to an error minimization; and determining a figure of merit for an input signal filtered by the CTE at the CTE setting value and the adapted DTE in combination;

selecting one of the plurality of values of the CTE setting responsive to the figure of merit values; and conditioning received input signals with the CTE at the selected setting value and the adapted DTE for that selected CTE setting value.

13. The method of claim 12, wherein the DTE comprises a feed-forward equalizer (FFE) and a decision-feedback equalizer (DFE);

and wherein the step of selecting one of the plurality of values of the CTE setting responsive to the figure of merit values comprises:

determining a relationship of figure of merit value versus CTE setting value;

determining, from the relationship, a range of CTE setting values having figure of merit values better than a threshold level; and selecting, for use in conditioning received input signals, a CTE setting value near a midpoint of the range.

14. The method of claim 12, wherein the DTE comprises a feed-forward equalizer (FFE) and a decision-feedback equalizer (DFE);

and wherein the step of selecting one of the plurality of values of the CTE setting responsive to the figure of merit values comprises:

determining a relationship of figure of merit value versus CTE setting value; and selecting, for use in conditioning received input signals, a CTE setting value at an offset from a value at which the relationship indicates a crossing of a threshold level.

15. The method of claim 12, wherein the receive path circuitry further comprises a slicer having an input coupled to an output of the DTE, for presenting at an output a quantized digital symbol value corresponding to a signal from the output of the DTE;

and wherein the step of adapting the DTE for each of the plurality of CTE setting values comprises:

determining an error gradient from an output of the slicer in a current iteration;

determining a convergence coefficient from the error gradient in a current iteration and an error gradient from a previous iteration; and updating tap weights of the at least one digital filter from a previous iteration responsive to a product of the convergence coefficient and the error gradient from the current iteration; and repeating the determining and updating steps until a convergence criterion is met.

16. The method of claim 15, wherein the step of determining the convergence coefficient comprises:

determining a dot product of the error gradient in the current iteration with the error gradient from the previous iteration;

responsive to the dot product having a negative value, decreasing the convergence coefficient from its value in a previous iteration; and responsive to the dot product having a positive value, increasing the convergence coefficient from its value in the previous iteration.

17. The method of claim 16, wherein the step of determining the convergence coefficient further comprises:

prior to either of the steps of increasing or decreasing the convergence coefficient, applying a hysteresis filter to the sign of the dot product of the error gradient in the current iteration.

18. The method of claim 15, wherein the step of determining the convergence coefficient comprises:

identifying a largest amplitude component of the error gradients in the current iteration and from the previous iteration;

responsive to the sign of the largest amplitude component changing from the previous iteration to the current iteration, decreasing the convergence coefficient from its value in a previous iteration; and responsive to the sign of the largest amplitude component not changing from the previous iteration to the current iteration, increasing the convergence coefficient from its value in the previous iteration.

19. A method of adapting a discrete time equalizer (DTE) including at least one discrete time filter having a plurality of tap weights, the method comprising:

filtering an input signal by the DTE to produce a filtered output;

quantizing the filtered output of the DTE to produce a digital symbol value;

determining an error gradient from the digital symbol value in a current iteration;

determining a convergence coefficient from the error gradient in a current iteration and an error gradient from a previous iteration; and updating tap weights of at least one discrete time filter from a previous iteration responsive to a product of the convergence coefficient and the error gradient from the current iteration; and repeating the determining and updating steps until a convergence criterion is met.

20. The method of claim 19, wherein the step of determining the convergence coefficient comprises:

determining a dot product of the error gradient in the current iteration with the error gradient from the previous iteration;

responsive to the dot product having a negative value, decreasing the convergence coefficient from its value in a previous iteration; and responsive to the dot product having a positive value, increasing the convergence coefficient from its value in the previous iteration.

21. The method of claim 20, wherein the step of determining the convergence coefficient further comprises:

prior to either of the steps of increasing or decreasing the convergence coefficient, applying a hysteresis filter to the dot product of the error gradient in the current iteration with the error gradient from the previous iteration.

22. The method of claim 19, wherein the step of determining the convergence coefficient comprises:

identifying a largest amplitude component of the error gradients in the current iteration and from the previous iteration;

responsive to the sign of the largest amplitude component changing from the previous iteration to the current iteration, decreasing the convergence coefficient from its value in a previous iteration; and responsive to the sign of the largest amplitude component not changing from the previous iteration to the current iteration, increasing the convergence coefficient from its value in the previous iteration.

* * * * *